(12) United States Patent
Osumi

(10) Patent No.: US 7,891,819 B2
(45) Date of Patent: Feb. 22, 2011

(54) PROJECTION IMAGE DISPLAY APPARATUS

(75) Inventor: Nobuyuki Osumi, Himeji (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 357 days.

(21) Appl. No.: 12/147,625

(22) Filed: Jun. 27, 2008

(65) Prior Publication Data
US 2009/0009727 A1 Jan. 8, 2009

(30) Foreign Application Priority Data
Jul. 2, 2007 (JP) .............................. 2007-173725

(51) Int. Cl.
*G03B 21/16* (2006.01)

(52) U.S. Cl. .......................... 353/54; 353/52; 353/119; 349/58; 362/373

(58) Field of Classification Search .................. 353/52, 353/54, 56, 57, 119; 349/5, 58; 362/294, 362/373
See application file for complete search history.

(56) References Cited

U.S. PATENT DOCUMENTS

| 7,244,029 B2 * | 7/2007 | Goik et al. ..................... 353/52 |
| 7,543,962 B2 * | 6/2009 | Miwa et al. .................. 362/294 |
| 2008/0276639 A1 * | 11/2008 | Stoddard .................... 62/259.2 |

FOREIGN PATENT DOCUMENTS

| JP | 2005-026575 A | 1/2005 |
| JP | 2005-164908 A | 6/2005 |

* cited by examiner

*Primary Examiner*—Kevin Pyo
(74) *Attorney, Agent, or Firm*—Marvin A. Motsenbocker; Mots Law, PLLC

(57) ABSTRACT

A light source disposed in a projector is cooled by use of a coolant. A cooling unit is disposed in a region that is spatially separated from at least an optical unit and an electrical circuit unit. In addition, piping between the cooling unit and a cooling member is separated from wiring from the electrical circuit unit.

9 Claims, 8 Drawing Sheets

PROJECTION IMAGE DISPLAY APPARATUS

This application claims priority under 35 U.S.C. Section 119 of Japanese Patent Application No. 2007-173725 filed Jul. 2, 2007, entitled "PROJECTION IMAGE DISPLAY APPARATUS".

BACKGROUND OF THE INVENTION

1. Field of the Invention

The present invention relates to a projection image display apparatus and, more particularly, is suitable for use in cooling a light source and the like by means of a coolant.

2. Description of the Related Art

In a projection image display apparatus (hereinafter referred to as "projector"), it is needed to efficiently remove heat generated by a light source and the like. Conventionally, the heat removal has been mainly carried out by air cooling with a fan or the like. Meanwhile, in response to recent requests for higher brightness, a light source has come to contain multiple lights, resulting in a need for more cooling efficiency. In using a solid light source such as a semiconductor laser as a light source, in particular, output of laser light is prone to fluctuate with temperature changes. Therefore, there is demand for more cooling efficiency increases and stricter temperature control.

According to the demand, a cooling method using a coolant can be used. The use of a coolant raises cooling efficiency as compared to the case with air cooling. Accordingly, it is possible to carry out heat removal and temperature control on a semiconductor laser smoothly and efficiently. The use of a coolant also decreases the number of fans as compared with air cooling, thereby reducing noise from a projector. Moreover, a coolant can be used to cool a liquid crystal panel. In the case of cooling with a coolant as above, it is necessary to pay attention to safety against leakage of the coolant.

SUMMARY OF THE INVENTION

Accordingly, a principal object of the present invention is to satisfy both improvement of cooling efficiency and assurance of safety against leakage of a coolant.

A projection display apparatus in one aspect of the present invention includes an optical unit for modulating and projecting light from light source, a cooling unit for circulating a coolant into a cooling member arranged in the optical unit, and an electrical circuit unit for electrically controlling each part. The cooling unit is disposed in a region that is spatially separated from at least the optical unit and the electrical circuit unit.

According to the projection display apparatus in this aspect, the cooling unit is disposed in a region that is spatially separated from the optical unit and the electrical circuit unit, and thus even though a coolant scatters from the cooling unit, the scattering coolant does not reach the optical unit or the electrical circuit unit, or does not cause any safety problem (such as short circuit) in the optical unit or the electrical circuit unit.

In the projection display apparatus of this aspect, the cooling unit, the optical unit and the electrical circuit unit may be arranged with partitions therebetween in horizontally separated regions. Accordingly, a coolant scattering from the cooling unit can be blocked by the partitions, without reaching the optical unit and the electrical circuit unit. In addition, even if a coolant leaks from the cooling unit, the partitions prevent the coolant from flowing into the optical unit and the electrical circuit unit.

Further, in the projection display apparatus of this aspect, the cooling unit, the optical unit and the electrical circuit unit may be arranged with partitions therebetween in vertically separated regions. Accordingly, a coolant scattering from the cooling unit can be blocked by the partitions, without reaching the optical unit and the electrical circuit unit.

In this case, the cooling unit is desirably placed in one of the vertically separated regions which is lower than those of the optical unit and the electrical circuit unit. By doing this, the optical unit and the electrical circuit unit are positioned above the cooling unit, and thus even if a coolant leaks from the cooling unit, the leaking coolant does not flow into the optical unit or the electrical circuit unit.

Further, the electrical circuit unit may be placed vertically farther from the cooling unit than the optical unit. This prevents a scattering or leaking coolant from reaching the electrical circuit unit, in a more thoroughgoing manner.

Moreover, in the projection display apparatus of this aspect, a drip pan may be provided to receive a coolant leaking from the cooling unit. This prevents more completely the leaking coolant from reaching the optical unit, the electrical circuit unit or electrical wiring.

Further, in the projection display apparatus of this aspect, piping may be installed between the cooling unit and the cooling member such that the coolant does not run over at least the optical unit and the electrical circuit unit. Accordingly, the leaking coolant from the piping can be prevented from flowing into the optical unit and the electrical circuit unit, even if the piping suffers damage or the like.

Furthermore, in the projection display apparatus of this aspect, the piping between the cooling unit and the cooling member may be separated from the wiring from the electrical circuit unit to prevent a coolant leaking from the piping from reaching the wiring even if the piping suffers damage or the like.

Besides, in the projection display apparatus of this aspect, it is desired to provide a leakage detection part for detecting leakage of a coolant. This makes it possible to, in response to detection of coolant leakage, take appropriate measures such as turning the power off automatically, thereby enhancing the safety of the projection image display apparatus.

BRIEF DESCRIPTION OF THE DRAWINGS

The above-mentioned and other objectives and novel features of the present invention will be more fully understood by reading the description of preferred embodiments below in combination with the attached drawings as follows.

However, the drawings are merely intended for illustration and do not limit the scope of the present invention.

DESCRIPTION OF PREFERRED EMBODIMENTS

Preferred embodiments of the present invention will be described with reference to the drawings. In this embodiment, when a projector is placed on a plane in parallel with the horizontal, an optical unit, an electrical circuit unit and a cooling unit are aligned in a horizontal direction.

Figure 1:
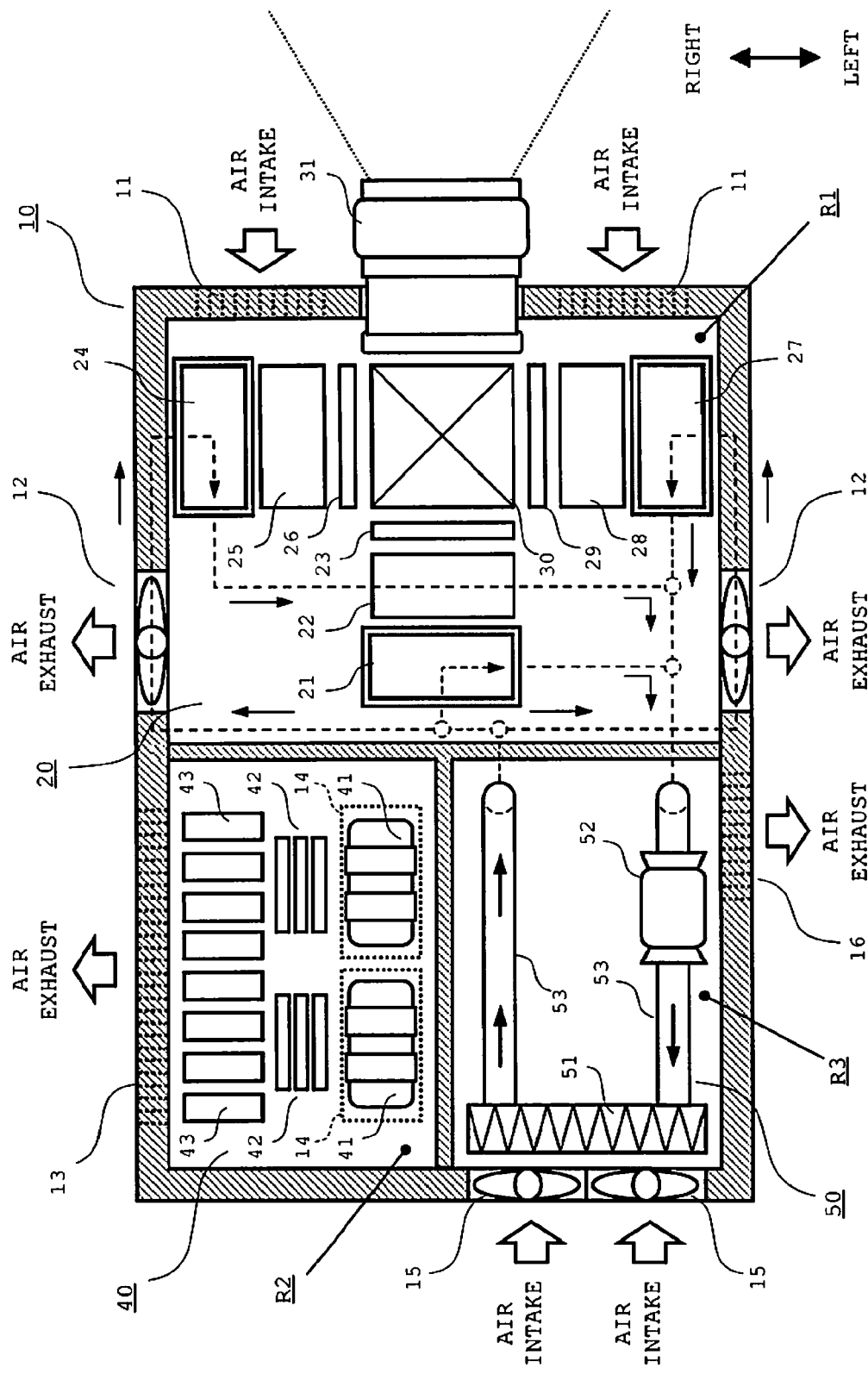
FIG. 1 is a diagram showing a configuration of a projector in an embodiment.
Figure 2:
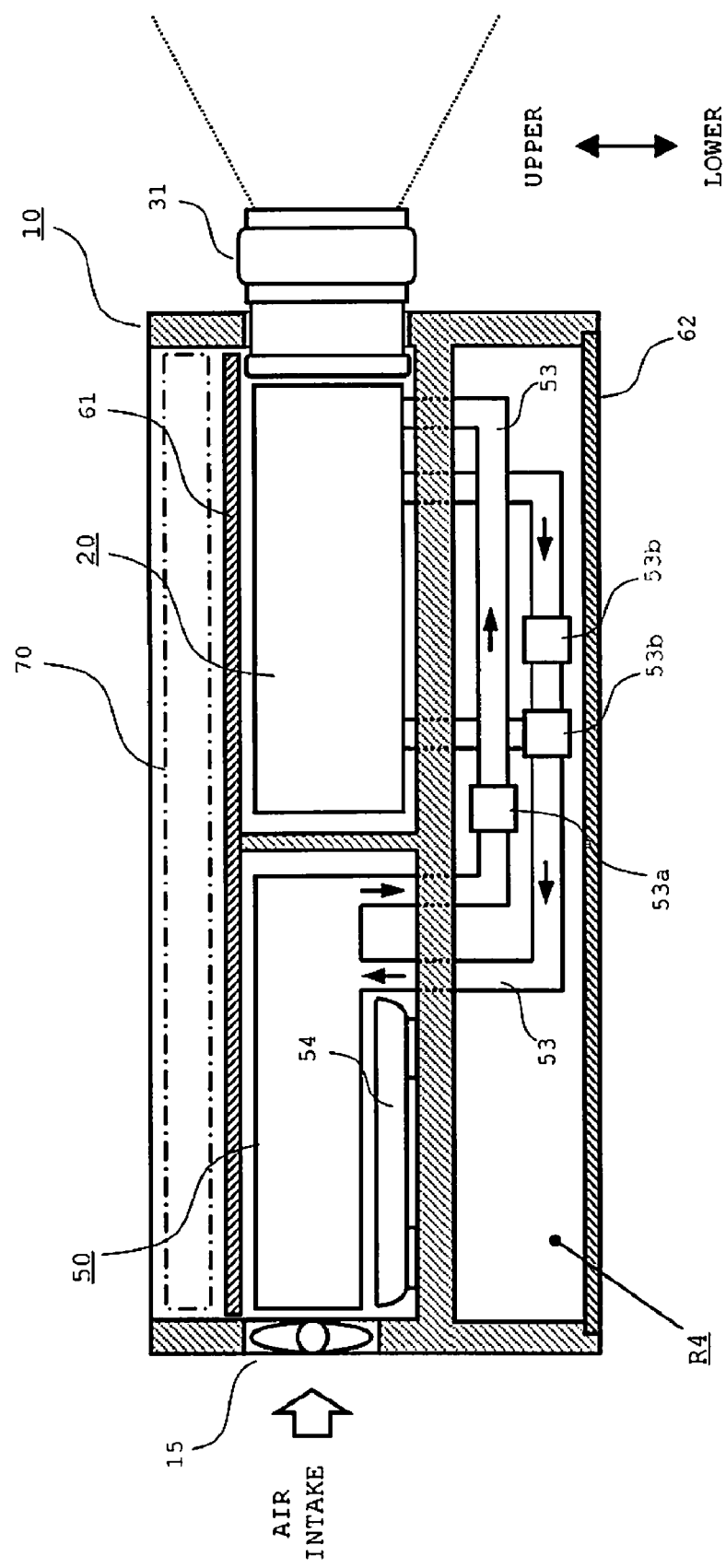
FIG. 2 is a diagram showing the configuration of the projector in the embodiment.

FIGS. 1 and 2 illustrate a configuration of a projector in an embodiment. FIG. 1 is a top view of main parts of the projector, and FIG. 2 is a perspective view of the main parts of the projector as seen from a left side thereof.

First, with reference to FIG. 1, a reference numeral 10 denotes a cabinet that stores an optical unit 20, an electrical circuit unit 40 and a cooling unit 50. The cabinet 10 has the shape of a bottomed box with an upper side opened, and a space at the upper side thereof is divided into three regions R1, R2 and R3 by integrally formed walls (partitions). The optical unit 20, the electrical circuit unit 40 and the cooling unit 50 are stored in the three regions R1, R2 and R3, respectively.

The optical unit 20 includes light source parts 21, 24 and 27, optical systems 22, 25 and 28, liquid crystal panels 23, 26 and 29, a dichroic prism 30, and a projection lens 31. The light source parts 21, 24 and 27 include semiconductor lasers as light-emitting sources, and emit laser light in a green wavelength band, a red wavelength band and a blue wavelength band, respectively. The light source parts 21, 24 and 27 are provided with cooling structures (described later) for cooling the semiconductor lasers, and a coolant from the cooling unit 50 is circulated in the cooling structures. In FIG. 1, the dotted lines indicate a flow path of a coolant in schematic form.

Laser light emitted from the light source parts 21, 24 and 27 is applied to the liquid crystal panels 23, 26 and 29 via the optical systems 22, 25 and 28, respectively. The laser light is modulated when passing through the liquid crystal panels 23, 26 and 29, and then combined by the dichroic prism 30. The combined laser light is projected by the projection lens 31 onto a projection plane (such as a screen).

In side surfaces of the region R1, an air-intake slit 11 is formed and a fan 12 is provided for air intake and exhaust of the region R1. Heat generated from the optical unit 10 is removed and released outside by airflow arising from the air intake and exhaust. Further, heat is removed from the light source parts 21, 24 and 27 by circulating the coolant through the cooling structures (described later), as stated above.

The electrical circuit unit 40 includes a circuit board 42 for holding a control circuit, a light source driver circuit 43 for driving the light source parts 21, 24 and 27, and a sirocco fan 41 for producing airflow in the region R2. An air-exhaust slit 13 is formed in a side surface of the region R2, and an air-intake slit 14 is formed in a bottom surface of the region R2 at a placement position of the sirocco fan 41. Heat generated from the electrical circuit unit 40 is removed and released outside by airflow arising from the sirocco fan 41.

The cooling unit 50 includes a radiator 51 and a pump 52. Piping 53 links an inlet port of the radiator 51 to an outlet port of the pump 52. The piping 53 also links an outlet port of the radiator 51 to inlet ports of the cooling structures of the light source parts 21, 24 and 27. Further, the piping 53 links an inlet port of the pump 52 to outlet ports of the cooling structures of the light source parts 21, 24 and 27. Therefore, when the pump 52 is driven, a coolant is circulated through the radiator 51, the pump 52, and the cooling structures of the light source parts 21, 24 and 27.

A fan 15 is attached to a side surface of the region R3 opposed to the radiator 51. A slit 16 for exhausting air taken by the fan 15 is formed in another side surface of the region R3. When the pump 52 is driven, the fan 15 is actuated to blow outside air on the radiator 51. Heat transferred to the coolant at the time of passing through the light source parts 21, 24 and 27 is removed by airflow from the fan 15 when the coolant passes through the radiator 51.

Next, with reference to FIG. 2, a region R4 surrounded by side surfaces of the cabinet 10 is disposed at a bottom side of the cabinet 10. The piping 53 is stored in the region R4. More specifically, the piping 53 linked to the outlet port of the radiator 51 is guided to the region R4 via a hole through a bottom surface of the region R3, branched by a joint 53a, and extended to vicinities of the light source parts 21, 24 and 27. Then, the branched piping 53 is guided into the region R1 via holes formed in the vicinities of the light source parts 21, 24 and 27, and connected to the inlet ports of the cooling structures of the light source parts 21, 24 and 27.

In addition, the piping linked to the outlet ports of the cooling structures is guided into the region R4 via holes formed in the vicinities of the light source parts 21, 24 and 27, and then integrated by a joint 53b. The integrated piping is guided into the region R3 via a hole disposed in a vicinity of the pump 52, and then linked to the inlet port of the pump 52.

As shown in FIG. 2, the region R4 is closed by attaching a closing plate 62 to the cabinet 10 from the bottom side. In addition, a plate 61 is attached on the regions R1, R2 and R3, and wiring from the electrical circuit unit 40 is installed on the plate 61. Specifically, the wiring from the light source driver circuit 43 passes over an upper surface of the plate 61, extends to the vicinities of the light source parts 21, 24 and 27 and then connects to the light source parts 21, 24 and 27 from the upper side via holes formed in the plate 61. In addition, wiring for the liquid crystal panels 23, 26 and 29, the fans 12 and 15, and the pump 52, passes from the circuit board 42 over the upper surface of the plate 16, and connects to a corresponding apparatus or base material from the upper side via a hole formed in the plate 16.

The region R3 is provided with a drip pan 54 for receiving a coolant leaking from the cooling unit 50.

Figure 3:
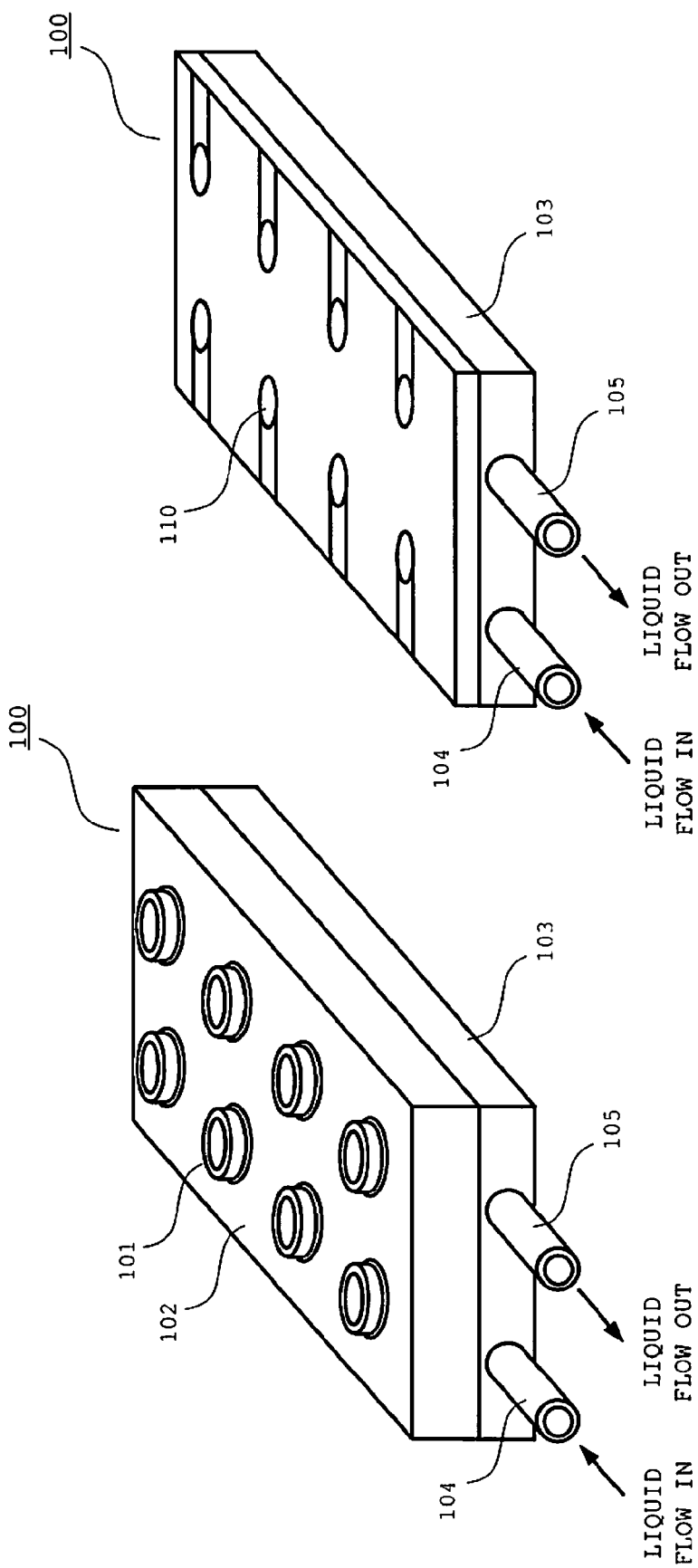
FIGS. 3A and 3B show configuration examples of a light source part in the embodiment.

FIGS. 3A and 3B illustrate configuration examples of one light-emitting structural body 100 (formed of a laser emission structure and a cooling structure thereof) disposed in the light source parts 21, 24 and 27. It is noted that a configuration for applying a drive current to the semiconductor lasers and laser devices is omitted from the drawings.

In the configuration example of FIG. 3A, the light-emitting structural body 100 is formed by attaching a holding member 102 for holding eight semiconductor lasers 101 on a top surface of the cooling member 103. Linking portions 104 and 105 are formed in the cooling member 103 for linkage with the piping 53, and a coolant flows into and out of the cooling member 103 via these linking portions 104 and 105. The cooling member 103 has a flow path formed in a predetermined pattern. The cooling member 103 and the holding member 102 are formed from a highly heat-conductive material.

As shown in FIG. 3B, the eight laser devices 101 may be formed directly on the top surface of the cooling member 103 by use of a semiconductor manufacturing technique to constitute the light-emitting structure 100. In this case, as compared to the example of FIG. 3A, the light-emitting structural body 100 can be reduced in size and raised in integration degree. In addition, since the laser devices 101 are formed directly on the cooling member 103, the efficiency of cooling the laser devices 101 is increased.

The numbers of the semiconductor lasers 101 and the laser devices 110 contained in one light-emitting structural body 100 are not limited to the numbers (eight) shown in FIGS. 3A and 3B, and may be any others as appropriate. Further, although a semiconductor laser is used as a light-emitting device in this embodiment, any other solid light-emitting device (such as a laser diode) may be used as a light-emitting device. In this case, the semiconductor lasers 101 and the laser devices 110 shown in FIGS. 3A and 3B are replaced with laser diodes or the like.

The light source parts 21, 24 and 27 shown in FIG. 1 are each provided with one or more light-emitting structural bodies 100 shown in FIGS. 3A and 3B. If a plurality of light-emitting structural bodies 100 are provided, the piping 53 is branched and a coolant is guided to each of the light-emitting structural bodies 100, accordingly.

Figure 4:
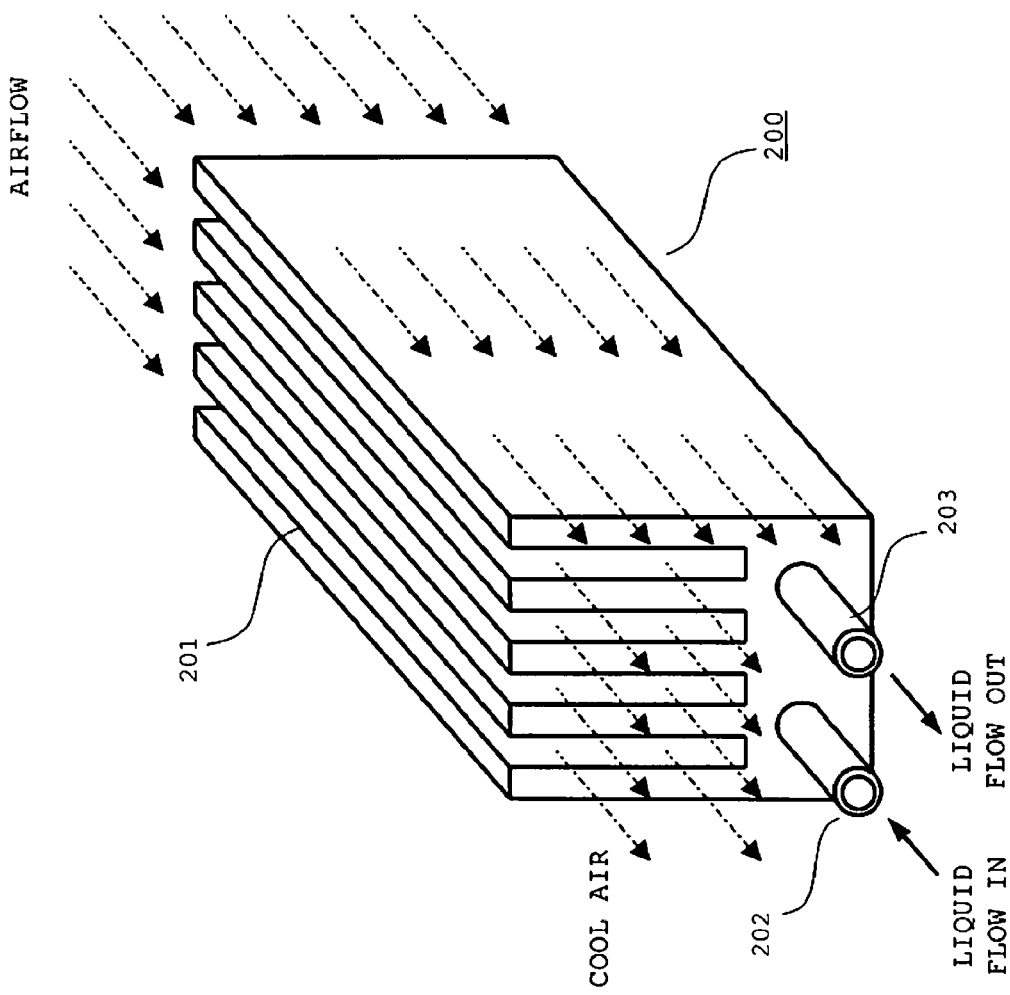
FIG. 4 is a diagram showing a configuration of a cooling member in the embodiment.

In the configuration shown in FIG. 1, a cooling member 200 shown in FIG. 4 may be further provided in a vicinity of the slit 11 or in vicinities of the liquid crystal panels 23, 26 and 29. In the cooling member 200, linking portions 202 and 203 are provided for linkage with the piping 53, and a flow path is formed in a predetermined pattern so as to link the linking portions 202 and 203 together. A fin 201 is formed on a top of the cooling member 200, and air is cooled by passing through the fin 201.

When the cooling member 200 is disposed in the vicinity of the slit 11 or in an upstream portion of airflow on the liquid crystal panels 23, 26 and 29, the cooled air is guided into the overall optical unit 20 or the liquid crystal panels 23, 26 and 29. Accordingly, it is possible to efficiently remove heat from the optical unit 20 or the liquid crystal panels 23, 26 and 29. In this case, the piping 53 is further branched and a coolant is guided by the branched piping into the cooling member 200. Alternatively, the cooling member 200 shown in FIG. 4 may be disposed in a vicinity of a circuit with large heat generation in the electrical circuit unit 40.

Figure 5:
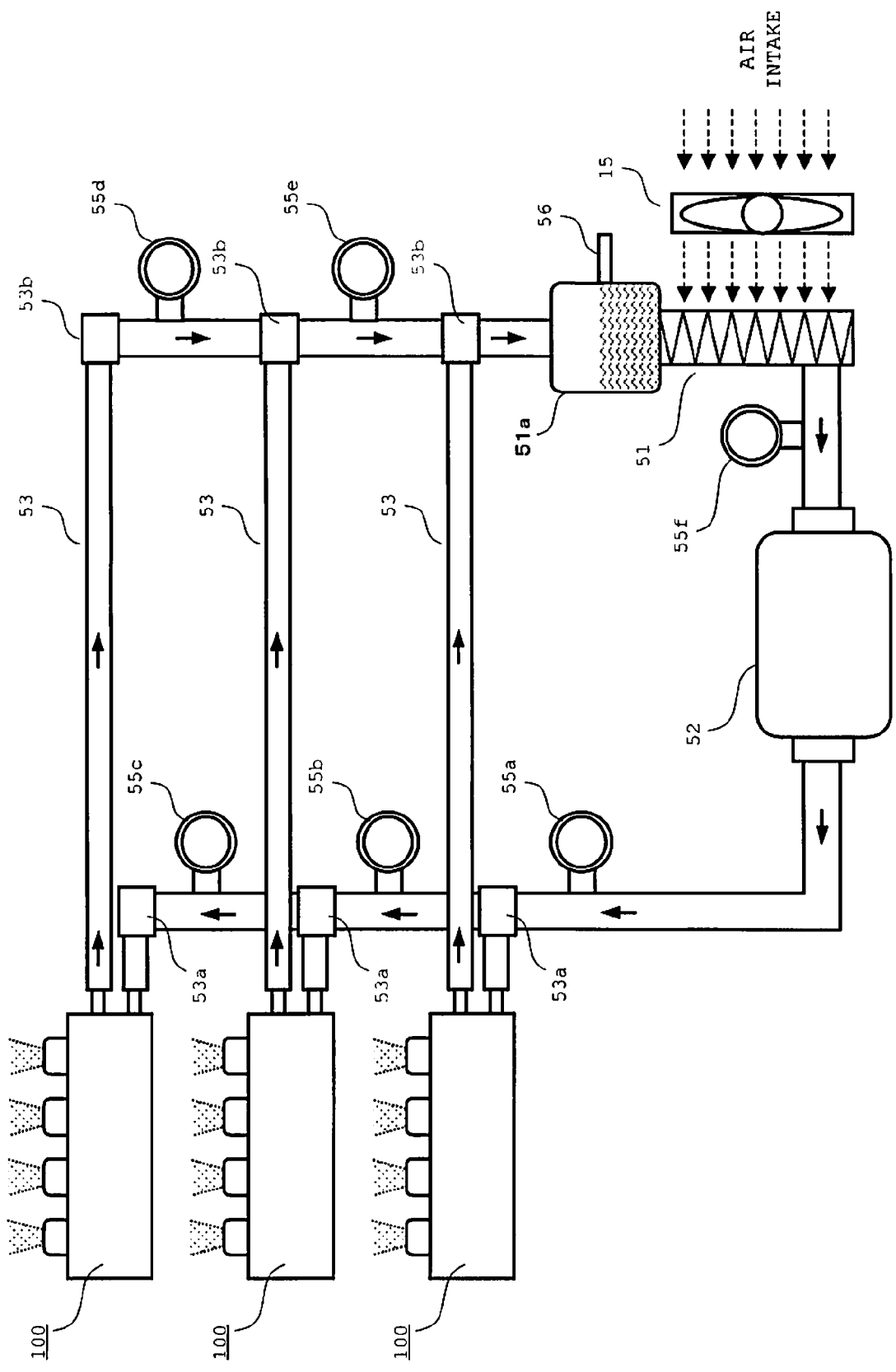
FIG. 5 is a diagram showing a state of piping between a cooling unit and the light source part in the embodiment.

FIG. 5 is a diagram showing schematically a configuration of the light-emitting structural body 100, the cooling unit 50 and the piping 53.

As shown in the drawing, the piping 53 has pressure sensors 55a to 55f for detecting a fluid pressure of a coolant at multiple sites. In addition, a cooling water tank 51a in the radiator 51 has a level sensor 56 for detecting a fluid level of a coolant existing in the cooling water tank 51a.

The pressure sensors 55a to 55f and the level sensor 56 are used to detect leakage of a coolant. For example, if a pressure at the pressure sensor 55a is normal and pressures at the downstream pressure sensors 55b to 55f are not normal, it will be determined that coolant leakage has occurred downstream from the pressure sensor 55a. Similarly, if a pressure at the pressure sensor 55b is normal and pressures at the downstream pressure sensors 55c to 55f are not normal, it will be determined that coolant leakage has taken place downstream from the pressure sensor 55b. As above, a coolant leakage site is identified by detecting an abnormal pressure at each of the pressure sensors.

In addition, if a rate of change in a fluid level detected by the level sensor 56 becomes equal to or more than a threshold value, it will be determined that coolant leakage has occurred at some site.

Figure 6:
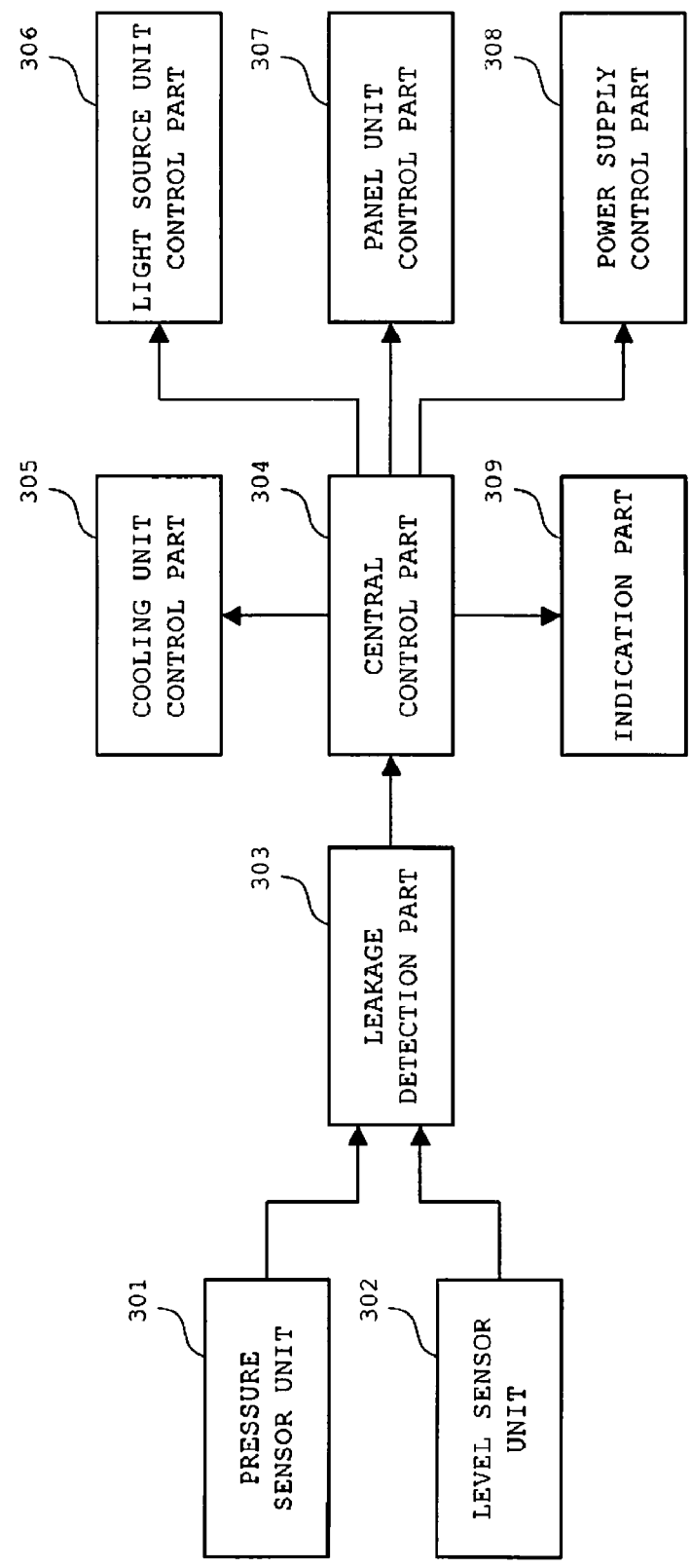
FIG. 6 is a functional block diagram of the projector in the embodiment.

FIG. 6 is a functional block diagram of the projector in this embodiment.

The pressure sensor unit 301 and the level sensor unit 302 include the pressure sensors 55a to 55f and the level sensor 56 shown in FIG. 5. A leakage detection part 303 detects leakage of a coolant based on detection signals from the pressure sensors 55a to 55f and the level sensor 56, as described above, and transmits a detection result to a central control part 304.

A cooling unit control part 305 controls the cooling unit 50 in accordance with instructions from the central control part 304. A light source unit control part 306 controls the light source parts 21, 24 and 27 in accordance with instructions from the central control part 304. A panel unit control part 307 controls driving of the liquid crystal panels 23, 26 and 29 in accordance with instructions from the central control part 304.

A power supply control part 308 distributes an AC voltage input from a power supply terminal to each part in accordance with instructions from the central control part 304. An indication part 309 provides information in a display in accordance with instructions from the central control part 304.

Upon occurrence of cooling water leakage, the leakage detection part 303 inputs a detection signal to the central control part 304. In response, the central control part 304 turns off the cooling unit 305, the light source parts 21, 24 and 27 and the liquid crystal panels 23, 26 and 29, and issues a control instruction to the power supply control part 308 to shut off voltage supply to each part. Accordingly, the projector is deactivated for safety assurance. At this time, the indication part 309 may report the occurrence of cooling water leakage and show a position where the cooling water leakage has occurred.

According to this embodiment, as shown in FIG. 1, the region R3 in which the cooling unit 50 is stored is separated by walls (partitions) from the regions R1 and R2 in which the optical unit 10 and the electrical circuit unit 40 are stored, respectively. Thus, even if the cooling unit 50 suffers damage or the like and a coolant scatters or leaks, the coolant does not reach the optical unit 10 or the electrical circuit unit 40.

In addition, as shown in FIG. 2, all the piping 53 between the cooling structures of the light source parts 21, 24 and 27 and the cooling unit 50, passes through the region R4 at the bottom side. Thus, even if the piping 53 suffers damage or the like, a scattering or leaking coolant does not enter the electrical system components (the light source parts 21, 24 and 27, the liquid crystal panels 23, 26 and 29, and the like) of the optical unit 10 and the electrical circuit unit 40.

As shown in FIG. 2, the drip pan 54 is disposed under the cooling unit 50, and thus, even if a coolant leaks from the cooling unit 50, the coolant can be prevented from scattering.

In addition, wiring 70 from the electrical circuit unit 40 passes through the uppermost-stage region completely separated from a laying route of the piping 53 as shown in FIG. 2, and thus even if the piping 53 or the like suffers damage, leaking cooling water cannot contact the wiring 70.

As above, according to this embodiment, even if a coolant leaks from the cooling unit 50 or the piping 53, the leaking coolant does not reach the optical unit 20, the electrical circuit unit 40, or the wiring 70, and does not cause any safety problem (such as short circuit). Further, the projector is deactivated in response to coolant leakage, resulting in safety assurance.

Therefore, according to this embodiment, it is possible to provide a projector which realizes both the improvement of cooling efficiency by use of a coolant and the assurance of safety against coolant leakage.

Another Embodiment

In the foregoing embodiment, the optical unit 20, the electrical circuit unit 40 and the cooling unit 50 are disposed in parallel to a horizontal plane. Described below is a configuration example in which those units are vertically arranged.

Figure 7A:
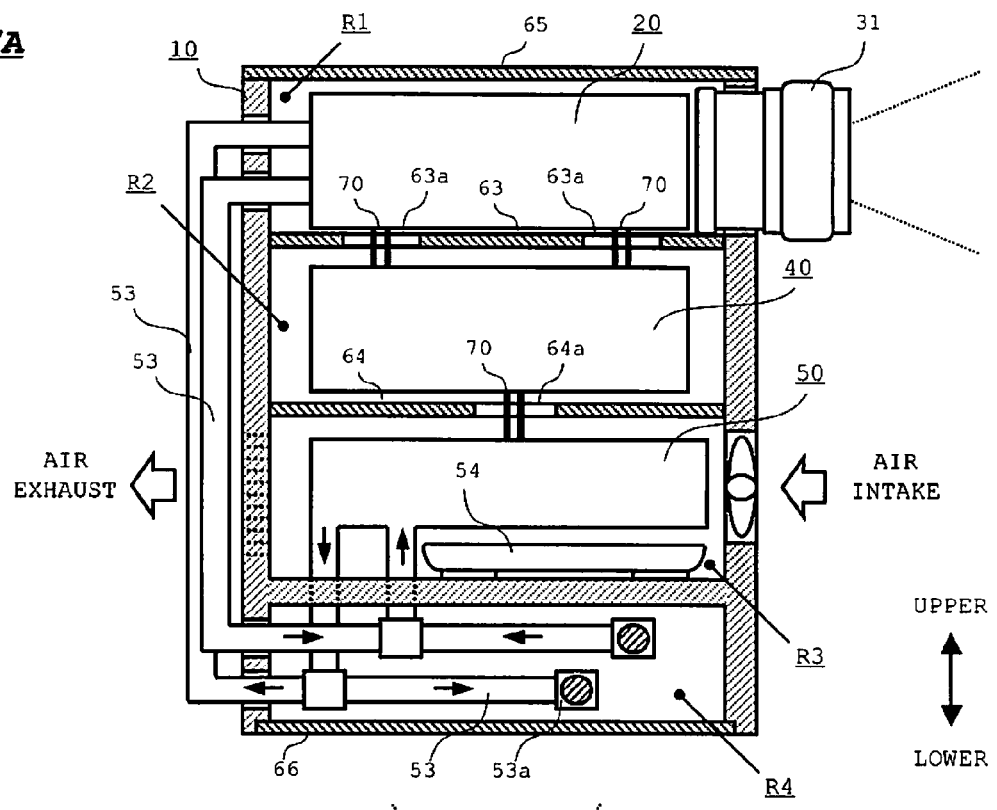
FIGS. 7A and 7B show another configuration example of the projector in the embodiment.
Figure 7B:
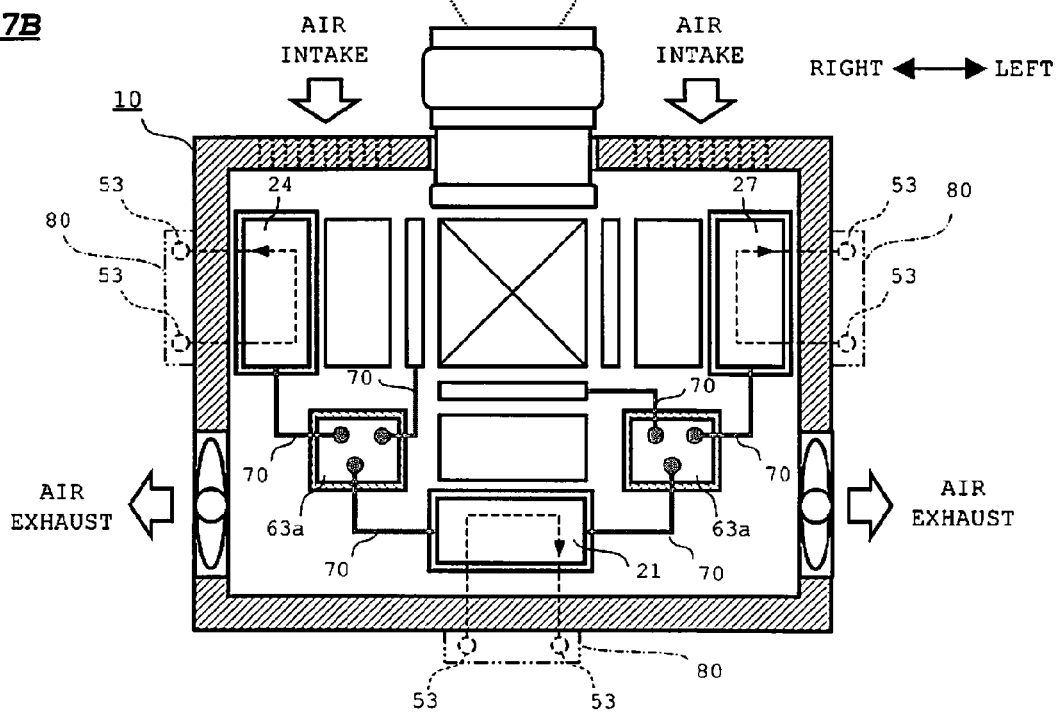

FIG. 7A is a perspective view of main parts of a projector in this embodiment as seen from a left side thereof (a side surface with a slit 16). FIG. 7B is a top view of main parts in an uppermost stage of the cabinet.

The cabinet 10 has the shape of a bottomed box with upper and lower sides opened. A space at the upper side is separated into three regions R1, R2 and R3 by attaching two additional plates 63 and 64. Out of the three regions, the optical unit 20 and the electrical circuit unit 40 are stored in the upper-stage and middle-stage regions R1 and R2, respectively, and the cooling unit 50 is stored in the lower-stage region R3.

The piping 53 from the cooling unit 50 is guided into the lower region R4 and branched there, and then guided outside through a hole formed in a side surface of the cabinet 10, as in the embodiment shown in FIGS. 1 and 2. Then, the piping 53 extends up to the upper stage along the side surface of the cabinet 10, passes through holes formed in vicinities of the light source parts 21, 24 and 27 at the upper-stage sides, and links to the cooling structures of the light source parts 21, 24 and 27. A cover 80 is attached on a side surface of the cabinet 10 to cover the piping 53.

The plate 63 has an opening 63a formed in a predetermined position, and the wiring 70 from the electrical circuit unit 40 is guided via the opening 63a to the optical unit 20 for connection with the light source parts 21, 24 and 27, the liquid crystal panels 23, 26 and 29, and the like. In addition, the plate 64 has an opening 64a formed in a predetermined position, and the wiring 70 from the electrical circuit unit 40 is guided via the opening 64a to the cooling unit 50 for connection with the pump 52 and the like. An upwardly projecting wall is formed along a peripheral edge of the opening 63a so that, even if a coolant leaks in the region R1, the coolant does not flow from the opening 63a into the electrical circuit unit 40.

Desirably, peripheral edges of the plates 63 and 64 are in close contact with an inner surface of the cabinet 10 so that, even if a coolant leaks, the coolant does not enter the lower stage. Further, it is desired to provide a gasket or the like between the peripheral edges of the plates 63 and 64 and the inner surface of the cabinet 10 for preventing entry of a coolant.

According to this embodiment, the region R3 in which the cooling unit 50 is stored is separated by the plate 64 from the region R2 in which the electrical circuit unit 40 is stored, and thus even if the cooling unit 50 suffers damage or the like and a coolant scatters, the coolant does not reach the electrical circuit unit 40.

In addition, all the piping 53 between the cooling structures of the light source parts 21, 24 and 27 and the cooling unit 50, passes through the region R4 and over the side surface of the cabinet 10. Thus, even if the piping 53 suffers damage or the like, a scattering or leaking coolant does not enter the electrical system components (the light source parts 21, 24 and 27, the liquid crystal panels 23, 26 and 29, and the like) of the optical unit 10 and the electrical circuit unit 40.

Further, as in the embodiment shown in FIGS. 1 and 2, the drip pan 54 is disposed under the cooling unit 50, and thus even if a coolant leaks from the cooling unit 50, scattering of the coolant does not take place.

Moreover, the wiring 70 from the electrical circuit unit 40 passes through the region completely separated from a laying route of the piping 53, and thus even if the piping 53 or the like suffers damage, leaking cooling water cannot contact the wiring 70.

As above, according to this embodiment, even if a coolant leaks from the cooling unit 50 or the piping 53, the leaking coolant does not reach the optical unit 20, the electrical circuit unit 40, or the wiring 70, or does not cause any safety problem (such as short circuit).

Figure 8A:
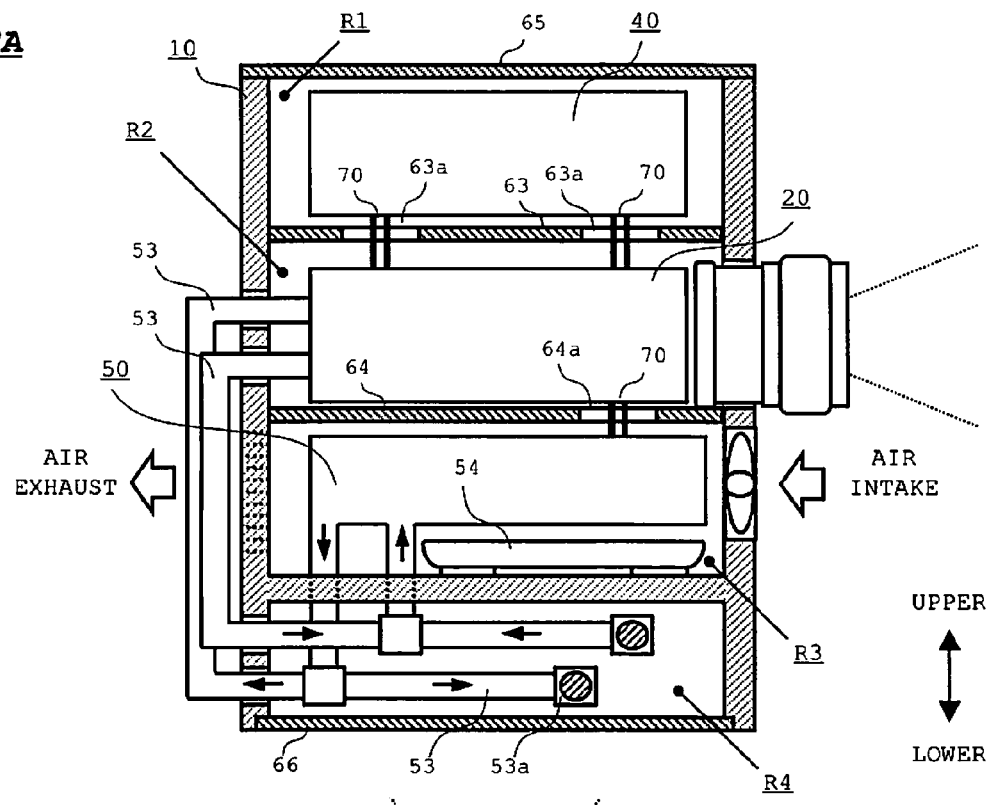
FIGS. 8A and 8B show another configuration example of the projector in the embodiment.
Figure 8B:
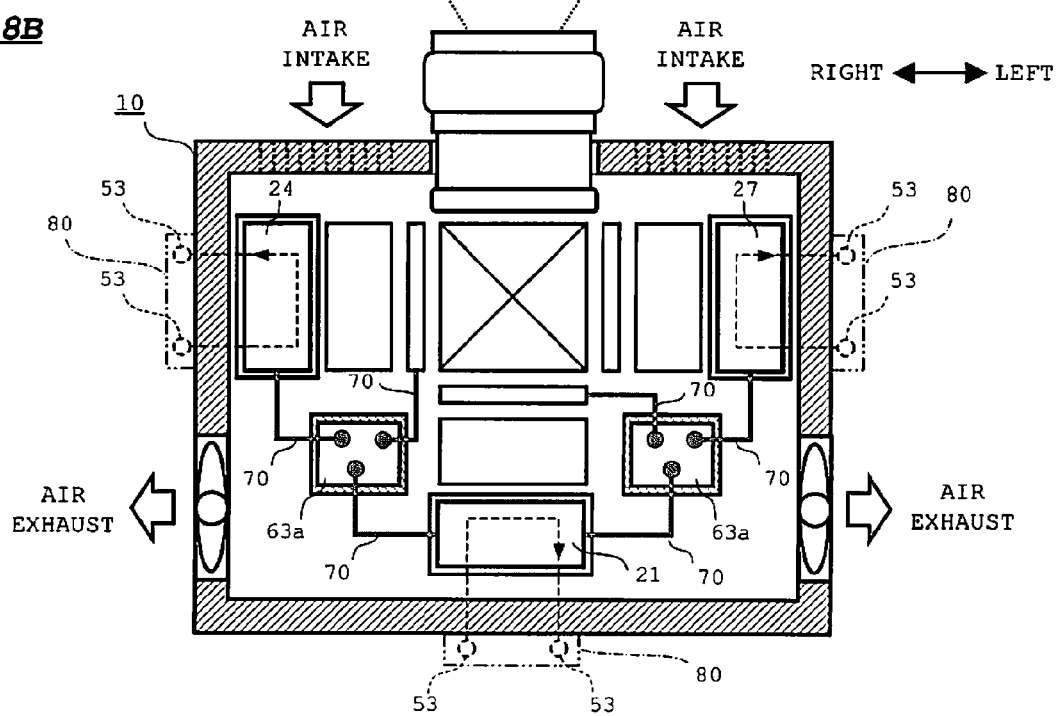

While in this embodiment the optical unit 20 is positioned in the upper stage and the electrical circuit unit 40 is positioned in the middle stage, the optical unit 20 may be positioned in the middle stage and the electrical circuit unit 40 may be positioned in the upper stage as shown in FIGS. 8A and 8B. This further decreases a possibility that a coolant scattering from the cooling unit 50 may reach the electrical circuit unit 40. FIG. 8A is a perspective view of main parts of the projector in this embodiment as seen from a left side, and FIG. 8B is a top view of main parts in the middle stage of the cabinet.

As above, embodiments of the present invention have been described. However, the present invention is not limited to the foregoing embodiments, and embodiments of the present invention can be modified in various manners other than described above.

For example, the optical system in the optical unit may be different as appropriate from the above described one. In addition, the present invention may have a lamp as a light-emitting source, as well as a semiconductor laser and a laser diode.

Further, while a transmissive liquid crystal panel is used as an imager in the foregoing embodiments, the present invention may also be applicable in the case of using a DMD (digital micromirror device) or the like as an imager. Further, while the pressure sensors 55a to 55f are used to detect coolant leakage in the foregoing embodiments, flow sensors may be used for detection of coolant leakage.

Embodiments of the present invention can be modified in various manners as appropriate, within the scope of technical ideas described in the claims.

What is claimed is:

1. A projection image display apparatus, comprising:
an optical unit for modulating and projecting light from light source;
a cooling unit for circulating a coolant into a cooling member arranged in the optical unit;
an electrical circuit unit for electrically controlling each part, wherein
the cooling unit is disposed in a region that is spatially separated from at least the optical unit and the electrical circuit unit;
a cabinet including at least one partition which defines at least a first, second and third area,
wherein the first area contains all components of an optical unit, the second area contains all components of a cooling unit, and the third area contains all components of an electrical circuit unit.

2. A projection image display apparatus according to claim 1, wherein
the cooling unit, the optical unit and the electrical circuit unit are arranged with partitions therebetween in horizontally separated regions.

3. A projection image display apparatus according to claim 1, wherein the cooling unit, the optical unit and the electrical circuit unit are arranged with partitions therebetween in vertically separated regions.

4. A projection image display apparatus according to claim 3, wherein
the cooling unit is placed in one of the vertically separated regions which is lower than those of the optical unit and the electrical circuit unit.

5. A projection image display apparatus according to claim 4, wherein the electrical circuit unit is placed vertically farther from the cooling unit than the optical unit.

6. A projection image display apparatus according to claim 1, further comprising: a drip pan for receiving the coolant leaking from the cooling unit.

7. A projection image display apparatus according to claim 1, wherein piping is installed between the cooling unit and the cooling member such that the coolant does not run over at least the optical unit and the electrical circuit unit.

8. A projection image display apparatus according to claim 1, wherein the piping between the cooling unit and the cooling member is separated from wiring from the electrical circuit unit.

9. A projection image display apparatus according to claim 1, further comprising:

a leakage detection part for detecting leakage of the coolant.

* * * * *